July 23, 1963

R. P. ANDERSON 3,098,305

ELECTRIC ANGLE CHECKING GAGE

Filed Aug. 29, 1961

INVENTOR
RICHARD P. ANDERSON

BY

ATTORNEYS
AGENT

July 23, 1963  R. P. ANDERSON  3,098,305
ELECTRIC ANGLE CHECKING GAGE
Filed Aug. 29, 1961  3 Sheets-Sheet 2

INVENTOR
RICHARD P. ANDERSON

BY
ATTORNEYS
AGENT

INVENTOR
RICHARD P. ANDERSON

United States Patent Office 3,098,305
Patented July 23, 1963

3,098,305
ELECTRIC ANGLE CHECKING GAGE
Richard P. Anderson, Danvers, Mass., assignor, by mesne assignments, to the United States of America as represented by the Secretary of the Navy
Filed Aug. 29, 1961, Ser. No. 134,780
9 Claims. (Cl. 33—174)

The present invention relates to a blade angle checking gauge and more particularly to a blade angle checking gauge that is provided with an electrical circuit which becomes completed when contact is made with both ends of the blade being checked.

It has been the practice in the art to employ various types of gauges and testing instruments for checking the blade angle of compressor blades as used in a turbojet engine. Prior to this invention the trend has been to use various instruments which check the curvature of the blade to determine the effective angle of compressor stator blades or vanes in their assembled state.

The general purpose of a device of this type of checking gauge is to take a reading of the effective angle of the stator blades in their original assembled state and then to take subsequent readings at regular inspection intervals and make a comparison with the original readings to determine whether or not the position or alignment of the particular blade under consideration has changed during the previous operating period. By so doing, it is readily apparent as to whether or not any of the blades have become loose or bent during the operating period immediately preceding the inspection.

The present invention provides a simple, practical and inexpensive way of checking the effective angle of compressor stator blades without the use of complex, time consuming devices as used in the past. The instant invention also permits the checking of the blade angle without removing the blade from the stator assembly.

An object of the present invention is the provision of a device that is simple, accurate and inexpensive to manufacture.

Another object is to provide a blade checking device which employs an electrical circuit which assures an exact reading that can be duplicated at subsequent inspections.

A further object of the invention is the provision of a gauge with an adjustable spacer which assures that all vanes are measured at the same section.

Still another object of the present invention is the provision of a device which provides a great degree of accessibility of the contact arm between close vanes and close stages of vanes.

Other objects and many of the attendant advantages of this invention will be readily appreciated as the same becomes better understood by reference to the following detailed description when considered in connection with the accompanying drawings wherein.

Figure 1:
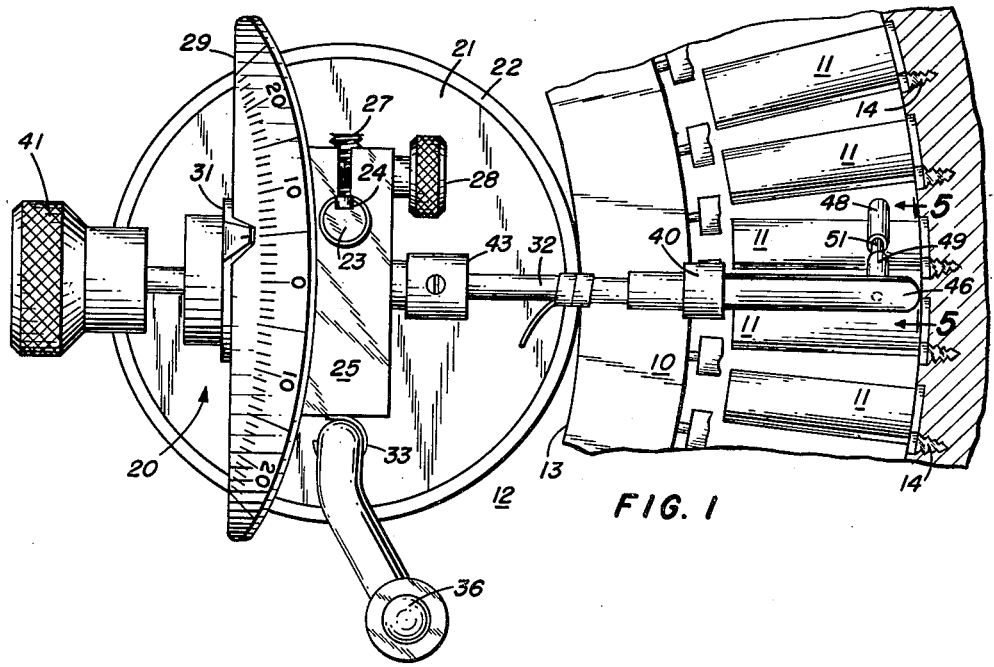
FIG. 1 shows a plan view, of a preferred embodiment of the invention, illustrating the manner in which the invention is used.
Figure 5:
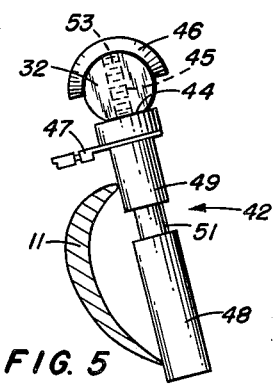

FIG. 5, an end view taken along the lines 5—5 of FIG. 1, illustrates the position of the contact arm when contact is made with both edges of the blade undergoing inspection.

Figure 6:
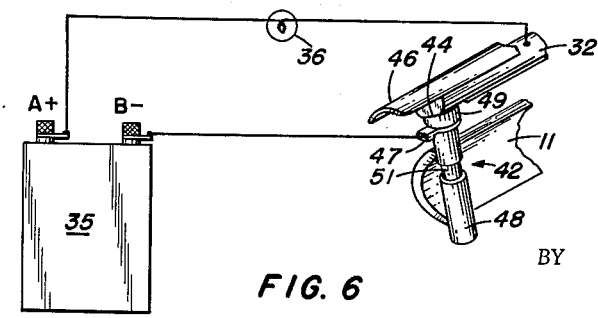

FIG. 6 is an electrical schematic of the circuit used for energizing the indicating light.

Referring now to the drawings, wherein like reference characters designate like or corresponding parts throughout the several views, there is shown in FIG. 1, which illustrates a preferred embodiment of the invention, a stator disk assembly 10 having a plurality of stator blades 11 fixedly secured thereto. Blades 11 are attached to disk assembly 10 by means of roots 14. The blade angle checking gauge 20 is placed on a flat surface 12 along with stator disk assembly 10. It is to be understood that the stator assembly 10 is completely annular in configuration, however, only a sector of the stator assembly 10 is shown for simplicity.

The blade angle checking device 20 is provided with a rotatable base 21, said base 21 being provided with a rubber collar 22 that makes rotating contact with the inner periphery 13 of the stator assembly 10. The purpose of this rubber collar 22 is to provide better traction between the base 21 and periphery 13 when the base 21 is rotated to move from one stator blade 11 to another stator blade 11. The collar 22 is secured to the base 21 by any suitable means such as glue or any other suitable bonding material.

Figure 2:
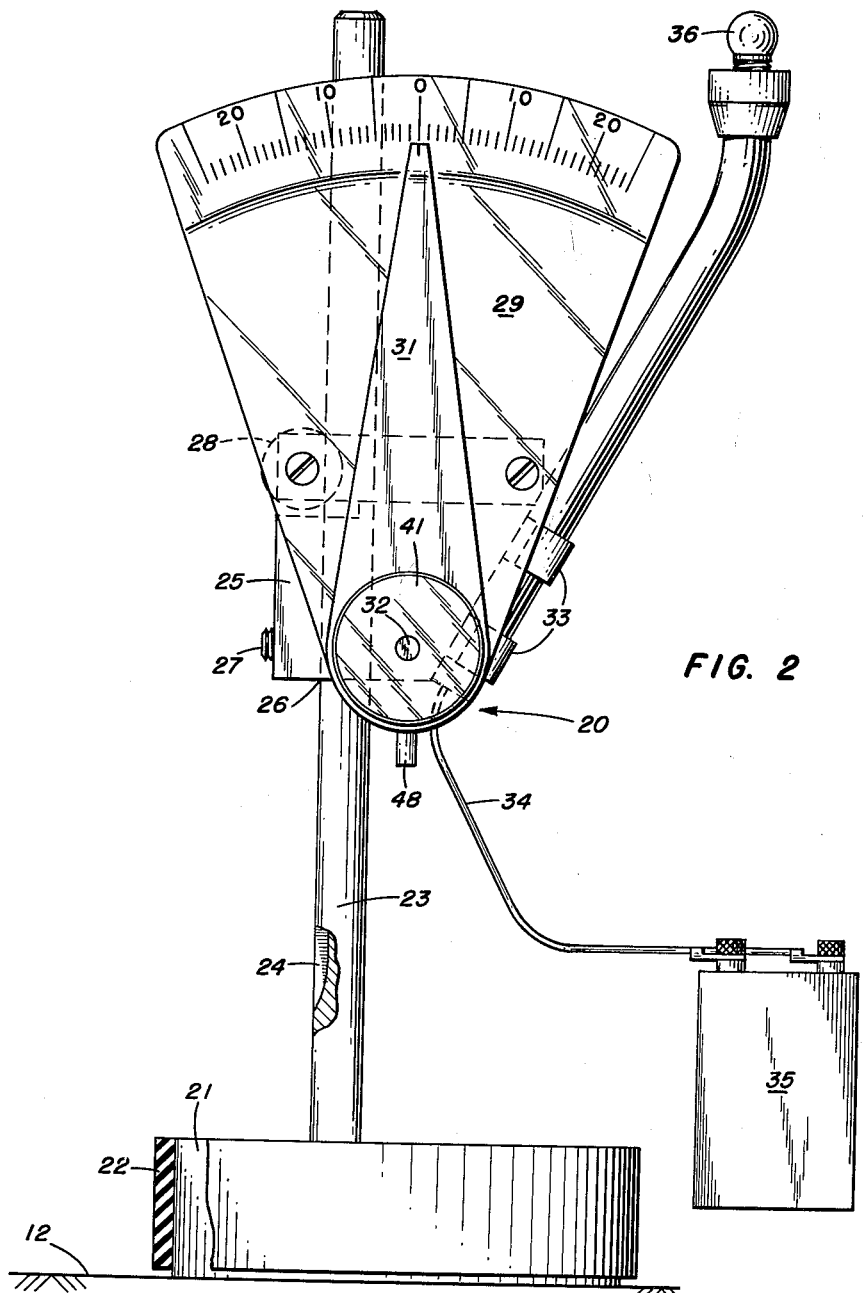
FIG. 2 is a front elevational view of the present invention showing the pointer and scale relationship.

FIG. 2 is a front elevational view of the blade angle checking device 20. As pointed out above, the device 20 is rotatably mounted on a base 21. Extending vertically from said base 21 is a shaft 23 that is provided with a keyway 24. Adjustably mounted on said shaft 23 is a mounting block 25. Said mounting block is provided with a bore 26 that receives said shaft 23. Mounting block 25 is further provided with a locking set screw 27 which engages said keyway 24 when tightened thereby preventing any undesired vertical movement of said mounting block. By means of this locking set screw 27 the mounting block 25 may be vertically adjusted to the desired height. In addition to set screw 27 there is thumb screw 28 as shown in FIG. 2 which also serves to lock the mounting block 25 in place at the desired height.

Mounting block 25 is provided with a plurality of threaded holes for securing protractor 29 thereto. As can be seen, protractor 29 is calibrated so an accurate reading can be taken. In addition, pointer 31 is rotatably mounted on boom 32. A pair of clips 33 serve to support hookup wire 34 which provides the power for the circuit. Attached to the one end of hookup wire is a battery power source 35 and the other end of said wire hookup is operably connected to a bulb 36.

Figure 3:
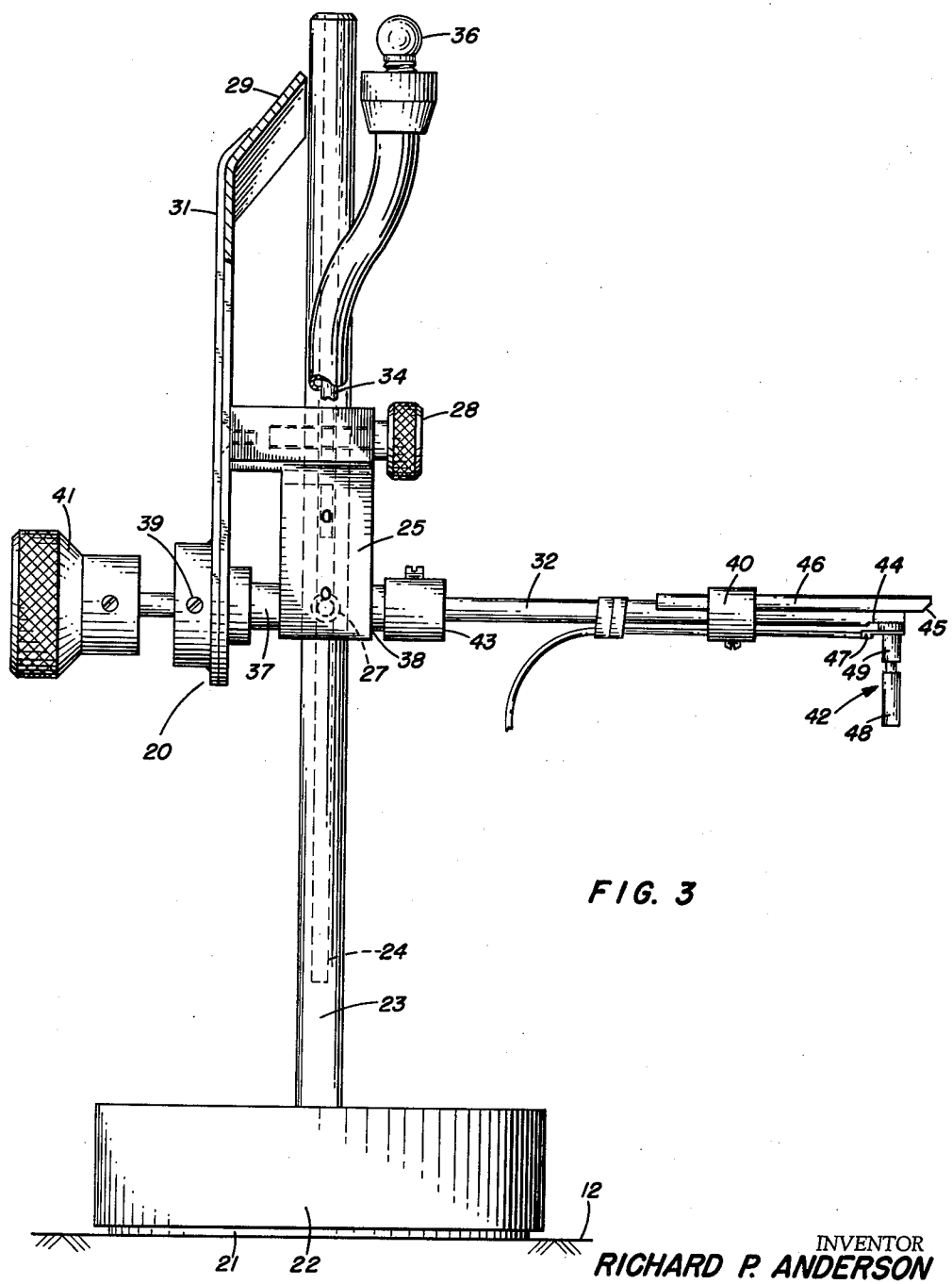
FIG. 3 is a side elevational view of the invention illustrating the manner in which the contact arm is connected to the pointer.

FIG. 3 is a side elevation of the device showing the manner in which boom shaft 32 is secured to mounting block 25. This view clearly shows the protractor 29 and pointer 31 as being bent at their outermost ends to approximately 45° from the vertical position. The purpose of this is to permit a reading to be taken when the viewer is above the device. As can be seen in this view, a bushing 37 is inserted into a bore 38 in mounting block 25. Boom 32 is inserted into bushing 37 and extends therethrough. The pointer 31 is secured to boom 32 by means of a set screw 39. At the one end of boom 32 is hand knob 41, this also being secured to the boom 32 by means of a set screw. The horizontal position of the boom 32 and contact arm 42 is limited by the position of collar 43 and its associated set screw.

It is to be noted that the extreme end of the boom 32 is undercut at 44 and provided with a threaded aperture 45 for receiving contact arm 42. A locating finger 46 is affixed to boom 32 by means of clip 40. The locating finger 46 extends beyond the end of boom 32 and can be made from Texolite tubing or some other synthetic material. The purpose of locating finger 46 is to permit the operator to know when the shaft 32 comes into contact with the blade about to be tested without doing any damage thereto.

Figure 4:
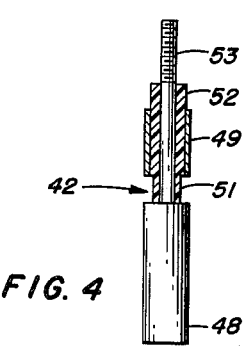
FIG. 4 is an enlarged view of the contact arm illustrating how it is constructed.

FIG. 4 is an enlarged illustration of contact arm 42. As can be seen in this view the contact arm 42 consists of two metal portions, a steel portion 48 and a copper portion 49. The steel portion 48 being covered with a plastic insulating material at 51 and 52. The end 53 of contact arm 42 is also steel but of a lesser diameter. The diameter being that of threaded aperture 45 which receives said contact arm 42.

Contact arm 42 is made by turning down a piece of steel rod to the diameter at end 53. Next a copper sleeve is concentrically inserted over the turned down portion of steel rod leaving a void space between the copper sleeve and the reduced diameter of steel rod at 53. This void space is filled with a plastic material and allowed to dry. Then the steel rod is placed in the chuck of a lathe and the excess copper tube and insulating material is removed. It is to be noted that copper portion 49 does not come into contact with steel portion 48 due to the gap at 51 where the plastic material insulates the two metals.

As explained below, it becomes readily apparent as to how the contact arm 42 completes the electrical circuit for indicating light 36 as the contact arm 42 comes into contact with both edges of blade 11 undergoing inspection.

FIG. 5 is an end view of FIG. 1 taken along the lines 5—5 looking in the direction of the arrows. This figure clearly illustrates the manner in which the blade angle checking device 20 is to be used. As pointed out above the hand knob 41 is rotated until the steel portion 48 and copper portion 49 each comes into contact with one of the edges of blade 11. When this is done, the electrical circuit is completed and the light indicator 36 lights up permitting a reading to be taken of the pointer 31 with respect to the protractor 29.

FIG. 6 is a schematic diagram of the electrical circuit employed in the instant device. Power is supplied by a drycell battery 35 of conventional design which is readily available on the open market. Terminal "A" of battery 35 is connected by proper lead wires to indicating light 36. Terminal "B" of battery 35 is connected to clip 47 which supplies current to contact arm 42. By means of steel portion 48 and copper portion 49 the electrical circuit is completed through blade 11 and pointer shaft 32 back to indicating light 36. The circuit is not completed merely by connecting the clip 47 to contact arm 42 because the insulating material at 52 insulates it from end 53. In order for current to pass through end 53, contact must be made between steel and copper portions, 48 and 49, respectively, then through the reduced diameter portion of the steel rod, to the boom 32 and back to the light 36 completing the circuit. It can readily be seen that the present invention provides a simple, accurate and permanent record of the blade being tested for comparison purposes with a future inspection set of readings.

Having explained the various figures, it is believed that a brief summary of the operation of the device would be useful, such as the following:

As indicated above, an assembled stator disk assembly 10 is placed on a granite surface plate such as 12. The blade angle checking device 20 is placed within the stator assembly 10 with the rubber collar 22 of rotatable base 21 abutting the inner periphery 13 of the stator disk assembly 10. The mounting block 25 of the device is raised to the desired height and then locked in the desired position by locking set screw 27 and thumb screw 28. Next, the boom 32 is extended horizontally until the desired chord section of the blade to be checked is reached. When this is done, the collar 22 and the necessary set screws are tightened. The boom 32 and contact arm 42 are rotated by turning hand knob 41. Prior to turning hand knob 41 the contact arm 42 is set in a horizontal position and the pointer 31 is set at zero degrees. By so doing this, a reading may be taken when the contact arm 42 is in contact with both edges of the vane, across the chord, this reading is then recorded and used for comparison purposes at subsequent inspections of the same blade at the same section.

Obviously many modifications and variations of the present invention are possible in the light of the above teachings. It is therefore to be understood that within the scope of the appended claims the invention may be practiced otherwise than as specifically described.

What is claimed is:

1. An apparatus for checking the chord angle of a compressor stator vane after being mounted on the stator assembly, said apparatus comprising a base, a shaft vertically mounted on said base, support means mounted on said shaft, angular measuring means mounted on said support means for indicating the chord angle, a boom perpendicularly extending from said support means, electrical contact means consisting of two conducting portions with an insulating material therebetween, said contact means attached to the extreme outer end of said boom, an electrical circuit comprising a battery, a pair of lead wires connected to said battery, an indicating light and said electrical contact means, the components of said electrical circuit being connected in series, said electrical circuit being completed when contact is made with both edges of the blade being checked by the conducting portions of said contact means whereby said indicating light is energized and said angular measuring means may be observed and recorded.

2. An apparatus for checking the chord angle of a compressor stator vane as described in claim 1 wherein said support means consists of a mounting block having a plurality of apertures therein, said shaft extending through one of said apertures and said angular measuring means consists of a protractor and pointer, said protractor being fixedly secured to said mounting block, said pointer being fixedly secured to said boom and rotatable therewith.

3. An apparatus for checking the chord angle of a compressor stator vane as described in claim 2 wherein said contact means consists of a contact arm that extends radially outward from the outermost end of said boom, said contact arm being formed by a steel portion that carries a copper portion, said steel and copper portions being insulated from each other and connected to different leads in said electrical circuit.

4. An apparatus for checking the chord angle of a compressor stator vane in assembled state comprising a rotatable base, a shaft vertically mounted on said base, a mounting block fixedly secured to said shaft, adjustment means for varying the height of said mounting block on said shaft, a protractor fixedly secured to said mounting block, a boom rotatably mounted on said mounting block, a pointer mounted on said boom, said pointer being located immediately forward of and cooperating with said protractor, said boom being mounted perpendicular to said vertical shaft, means for adjusting the horizontal position of said boom, a hand knob mounted at one end of said boom for rotating said boom, an electrical circuit comprising a battery, a pair of lead wires connected to said battery, an indicating light and contact means, said components of said circuit being connected in series, said contact means mounted on the other end of said boom for checking the chord angle of said blade, said indicating light indicating when said contact means makes contact with both edges of said blades whereby an angular reading on said protractor may be taken and compared with previous readings to determine whether or not the effective blade angle has changed.

5. An apparatus for checking the chord angle of a compressor stator vane as described in claim 4 wherein said contact means consists of a contact arm that extends radially outward from the outermost end of said boom, said contact arm being formed by a steel portion that carries a copper portion, said steel portion and said copper portion each being insulated from the other and connected to different leads in said electrical circuit.

6. An apparatus for checking the effective chord angle of a compressor stator vane in assembled state, said apparatus comprising a base member, a shaft vertically mounted on said base, a keyway in said shaft, supporting means mounted on said shaft, vertical adjustment means for adjusting the height of said supporting means, angular indicating means fixedly secured to said supporting means, a horizontally extendable boom rotatably mounted on said supporting means, pointer means mounted on said boom and cooperating with said angular indicating means, horizontal adjustment means for adjusting the horizontal position of said boom, an electrical circuit comprising a battery, a pair of lead wires connected to said battery, an indicating light and contact means, said components of said circuit being connected in series, said contact means fixedly secured to the outermost end of said boom, said indicating light indicating when said contact means comes into contact with both edges of said blade whereby an angular reading may be taken and recorded for comparison purposes with previous readings of said same blade.

7. An apparatus as described in claim 6 wherein said supporting means consists of a mounting block, said mounting block having a plurality of apertures therein, said vertical adjustment means consisting of a milled out portion in said mounting block, a thumb screw threadably received in said mounting block to provide a better clamping action in the area of said milled out portion, said vertical adjustment means consisting of a locking screw which operably engages said keyway in said shaft to further secure said mounting block to said shaft.

8. An apparatus as described in claim 6 wherein said angular indicating means consists of a graduated protractor, said protractor being fixedly secured to said supporting means, said horizontal adjusting means consisting of a collar fixedly secured to said boom when said boom is in the desired position.

9. An apparatus as described in claim 6 wherein said contact means consists of a contact arm that extends radially outward from the outermost end of said boom, said contact arm being formed by a steel portion that carries a copper portion, said steel portion and said copper portion each being insulated from the other and connected to different leads in said circuit.

References Cited in the file of this patent
UNITED STATES PATENTS

| | | |
|---|---|---|
| 2,178,264 | Meyer | Oct. 31, 1939 |
| 2,546,532 | Wade | Mar. 27, 1951 |
| 2,702,430 | Bohnet | Feb. 22, 1955 |

FOREIGN PATENTS

| | | |
|---|---|---|
| 138,943 | Great Britain | Feb. 26, 1920 |
| 1,220,708 | France | Jan. 4, 1960 |